Aug. 31, 1926.
E. H. LAW ET AL
1,598,142
FASTENING FOR COVERS OF SHIPS' HATCHES
Filed March 6, 1926
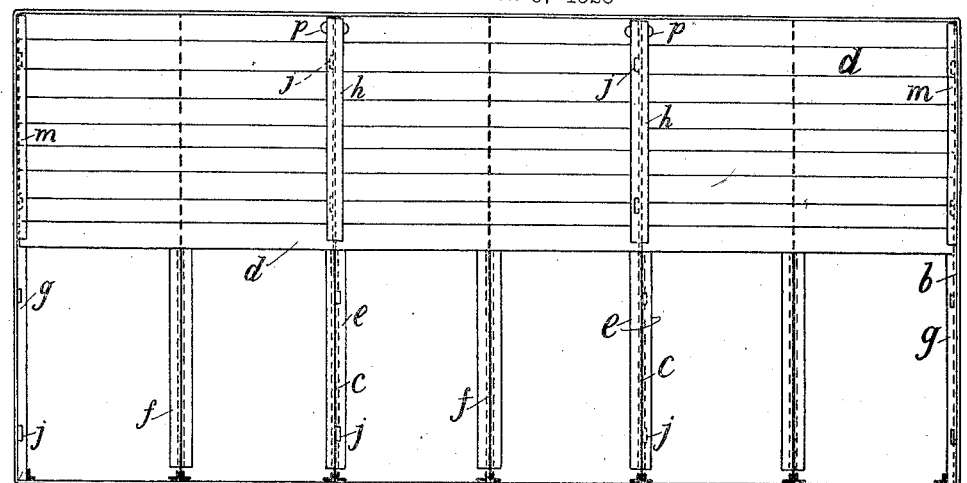
Fig. 1.
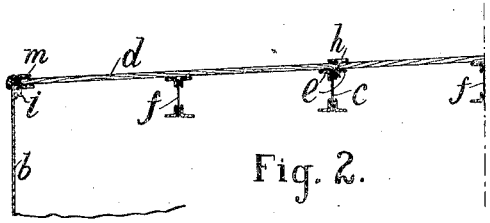
Fig. 2.
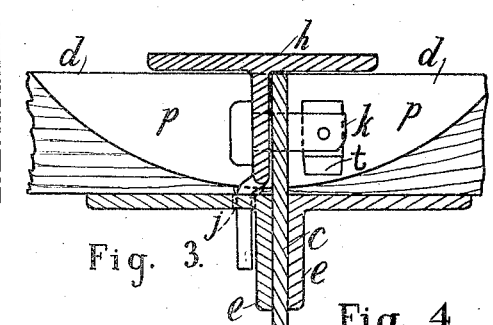
Fig. 3.
Fig. 5.
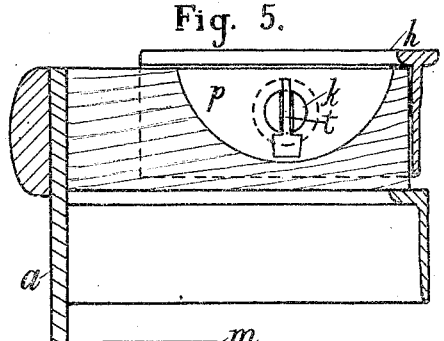
Fig. 4.
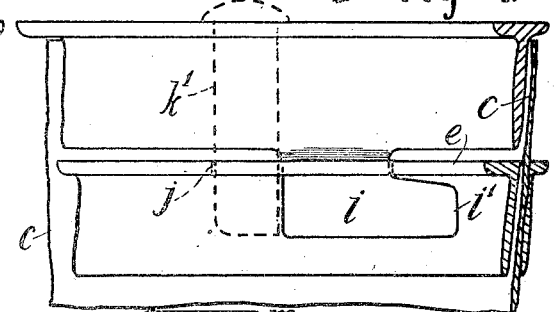
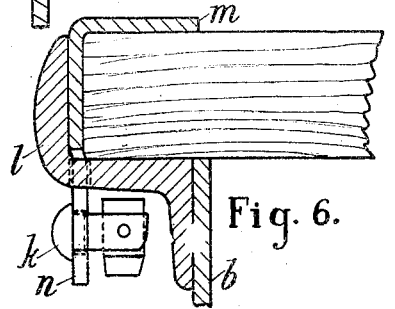
Fig. 6.
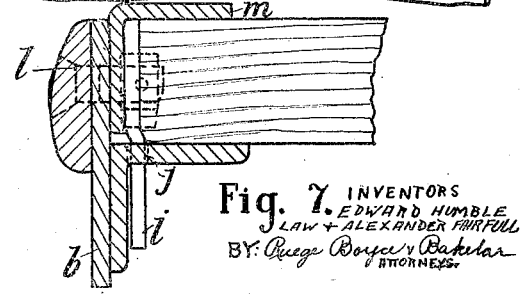
Fig. 7.
INVENTORS
EDWARD HUMBLE
LAW + ALEXANDER FAIRFULL
BY: Ruege Boyce v Bakelar
ATTORNEYS Patented Aug. 31, 1926.

1,598,142

UNITED STATES PATENT OFFICE.

EDWARD HUMBLE LAW AND ALEXANDER FAIRFULL, OF LONDON, ENGLAND.

FASTENING FOR COVERS OF SHIPS' HATCHES.

Application filed March 6, 1926, Serial No. 92,747, and in Great Britain March 3, 1925.

The various methods adopted for covering ships' hatches heretofore have had the disadvantage of the fastenings being of such a nature that there is a liability of the loss of parts of the fastening by reason of the same becoming detached from the hatch and furthermore such fastenings have been complicated, leading in many instances to the hatch boards which form the cover being dependent entirely upon the tarpaulin which is usually slung over the same keeping the boards in situ.

In the construction of hatches generally mid-way of the hatch (or at other suitable intervals) is placed a transverse hatch web, bar or bridge of T section which divides the hatch into two and affords means for supporting the inner ends of the timbers or boards that form the cover to the hatch, at the ends of the hatch are provided angle iron bars that serve the purpose of supporting the outer ends of the said boards or sectional covers which have been secured in position by transversely disposed angle and T bars the horizontal members of which overlap the ends of said covers, the ends of said locking bars being slid into sockets provided on the one side of the hatch whilst the opposite ends of said bars have been secured by bolts and locks to prevent their removal.

The improvements forming the subject matter of the present invention relate to this type of fastening and in accordance therewith to devise a simple device whereby the said boards may be securely held in their respective places on their supports so as to form a cover to the hatch which can only be removed when the device is unfastened and detached.

Given a hatch constructed as above described with the central transverse web or T-bar and transverse angles at the ends for supporting the sectional cover preferably the fastening is divided into six separate elements of a similar character and the angle irons at the ends of the hatch, as also the central T-bar, are provided with slots for example say three, with which each locking element engages.

Each of the end locking bar elements comprises a strip of metal of more or less right angle section with depending hooks that engage in the slots in the aforesaid supporting angles the said hooks being of such a nature as to engage with the ends of said slots when the element is slid in a parallel plane to the angles, the horizontally disposed member of the angle element engaging with or resting upon the ends of the several boards or sectional covers which are thereby held in place. The central locking element instead of being of right angle section is of a similar character but of T-section and obviously will cover or hold the inner ends of the boards to form the cover of the hatch on both sides of the central or intermediate bridge of the hatch, any convenient means may be employed for the retention of said locking elements in the locked position such as toggle bolts for example.

In the accompanying sheet of drawings is illustrated the fastening according to the present invention as applied to a large hatch having two transverse webs dividing the hatch into three parts.

Figure 1 is a plan of the hatch showing one half of the cover removed.

Figure 2 is a half-section of Figure 1.

Figure 3 is a detail section through one of the hatch webs.

Figure 4 is an elevation of part of the hatch web.

Figure 5 is a sectional elevation taken through the side of the hatch.

Figures 6 and 7 show the application of the invention to known types of hatch cover end supports.

Figures 3 to 7 are drawn to a larger scale than Figures 1 and 2.

Referring now to Figures 1 and 2 of the drawing $a$ is the hatch sides and $b$ the ends, $c$ represents the hatch webs having angle rest bars $e$ for supporting the inner ends of the boards of the hatch cover $d$.

In the hatch illustrated three intermediate supports $f$ are provided for the cover $d$.

The ends $b$ are provided with angle rest bars $g$ for supporting the outer ends of the cover boards. A method of securing the cover $d$ to the hatch by means of locking bars according to the present invention is shown in detail in Figures 3 to 7 to which reference may now be made.

In Figures 3 to 5 the locking bar $h$ is of T section and has two depending hooks $i$ autogenously welded thereto, but the hooks may be riveted or secured by any other suitable means, the said hooks project through suitable slots $j$ in the rest bars $e$ and are provided with projections $i'$ adapted to engage the horizontal member of the bars $e$ when the bars *h* are slid parallel with the hatch transverse webs or ends.

Near the side of the hatch are provided toggle bolts *k* that pass through the bars *h* and the transverse webs *c* and thus prevent relative lateral movement. The toggle bolt *k* is of usual construction with slotted end within which is pivotally mounted the T headed member *t* (Figures 3 and 5) that is raised into alignment with the axis of the bolt *k* for withdrawal but normally is disposed transversely thereof. Cavities *p* are cut or scooped out of the cover boards to facilitate insertion and removal of the bolts *k*. The bolts *k* may be preferably secured by chains to the hatch sides or to the locking bars to prevent loss or misplacement of same and instead of toggle bolts ordinary screwed bolts and nuts may be used or other suitable securing devices such for example as the key or pin *k'* shown in dotted lines Figure 4 which is passed through a hole provided therefor in the locking bar *h* and depends through the part of the slot *j* at the rear of the hook *i* when it is in the locked position.

Figures 6 and 7 illustrate two known types of hatch cover end supports. In Figure 6 the supporting member *l* is of Z-section and the locking bar *m* of angle section. The bolt *k* is passed through a lug *n* which is tapered so that when the bolt *k* is withdrawn the bar *m* can be removed by sliding it towards the side of the hatch and at the same time raising it slightly, the hooks *i* being shaped so as to permit this, as shown in Figure 7.

Presuming now it is desired to remove the other half of the cover *d* in Figure 1 the toggle bolts *k* would first be removed from the bars *h* and *m* which can then be slid laterally towards the side *a* of the hatch until the hooks *i* and their projections *i'* can pass through the slots *j* after which the bars and the cover can be removed. To replace the cover the boards are replaced, the hooks passed through the slots *j* slid laterally away from the side *a* of the hatch, and the bolts *k* replaced.

For convenience the hatch covers may be made in half sections in the case of large hatches as shown in Figure 1 each half being held or locked by bars *h* and *m* which only extend half-way across the cover *d*. The slots *j* may in such cases be cut on opposite sides of the transverse webs *c* as shown in Figure 1 so that the bars *h* on one side of the hatch cover may be interchangeable with those on the other side.

What we claim is:—

1. A fastening for covers of ships' hatches comprising angle bars the horizontally disposed members of which rest upon the ends of the several sectional cover boards whilst the vertically disposed members of said angle bars carry hook shaped dependences that engage in slots provided in the cover board bearer secured to the side of the hatch and means for the retention of said hook shaped dependences in said slots in their engaged position.

2. A fastening for covers of ships' hatches comprising T bars the horizontally disposed members of which rest upon the adjacent ends of the several sectional cover boards whilst the vertically disposed members of said T bars carry hook shaped dependences that engage in slots provided in the intermediate cover board bearers and means for the retention of said hook shaped dependences in said slots in their engaged position.

3. A fastening for covers of ships' hatches comprising rolled bars with horizontally and vertically depending disposed members the said horizontal members resting upon the ends of the several sectional cover boards whilst the vertically depending disposed members carry hook shaped dependences that engage with slots provided in the cover board bearers fixed to the sides and intermediate transverse bearers of the hatch and toggle bolts to secure said bars to said sides and transverse bearers of the hatch and retain the hook shaped dependences in their engaged position.

In testimony whereof we affix our signatures.

EDWARD HUMBLE LAW.
ALEXANDER FAIRFULL.